(12) United States Patent
Kordowski et al.

(10) Patent No.: US 9,499,061 B2
(45) Date of Patent: Nov. 22, 2016

(54) CHARGING PLUG WITH LOCKING IDENTIFICATION

(71) Applicant: Kiekert AG, Heiligenhaus (DE)

(72) Inventors: Bernhard Kordowski, Schwerte (DE); Michael Scholz, Essen (DE); Volker Westerwick, Bochum (DE)

(73) Assignee: Kiekert AG, Heiligenhaus (DE)

( * ) Notice: Subject to any disclaimer, the term of this patent is extended or adjusted under 35 U.S.C. 154(b) by 92 days.

(21) Appl. No.: 14/243,220

(22) Filed: Apr. 2, 2014

(65) Prior Publication Data

US 2014/0292275 A1 Oct. 2, 2014

Related U.S. Application Data

(63) Continuation of application No. 14/004,207, filed as application No. PCT/DE2011/001952 on Nov. 8, 2011, now abandoned.

(30) Foreign Application Priority Data

Nov. 18, 2010 (DE) .......................... 10 2010 044138

(51) Int. Cl.
*H02J 7/00* (2006.01)
*B60L 11/18* (2006.01)
*B60L 1/00* (2006.01)

(52) U.S. Cl.
CPC ............ *B60L 11/1818* (2013.01); *B60L 1/003* (2013.01); *B60L 11/1824* (2013.01);
(Continued)

(58) Field of Classification Search
USPC .......................................... 320/109; 439/304
See application file for complete search history.

(56) References Cited

U.S. PATENT DOCUMENTS

2011/0127780 A1* 6/2011 Barth et al. .................... 292/213
2011/0246014 A1* 10/2011 Sauper ................ B60L 11/1818
701/22

FOREIGN PATENT DOCUMENTS

DE 196 02 281 A1 7/1997
DE 10 2008 035607 A1 2/2010
(Continued)

OTHER PUBLICATIONS

International Search Report for corresponding Application No. PCT/DE2011/001952 dated May 8, 2012.

*Primary Examiner* — Samuel Berhanu
(74) *Attorney, Agent, or Firm* — Renner, Otto, Boisselle & Sklar, LLP

(57) ABSTRACT

A charging device for an electric vehicle, which charging device can be protected against unauthorized access in a particularly reliable manner. The charging device for an electric vehicle has a bolt for locking a connection between the charging device and a further charging device. If the charging device is mechanically connected to a further charging device for charging purposes, this mechanical connection is then locked by a corresponding end of the bolt being moved into a retaining opening in the further charging device. A retaining opening of this kind can, for example, be damaged by a broken web which serves for locking such that locking is no longer possible. Therefore, a device is provided which can prevent movement of the bolt in the direction of a locking position when the retaining opening is damaged in this way. A locking arrangement which is damaged in the above manner therefore fundamentally does not remain unnoticed. Charging therefore preferably requires sufficiently undamaged, correct locking of the two charging devices involved.

18 Claims, 3 Drawing Sheets

(52) U.S. Cl.
CPC ....... *B60L 11/1846* (2013.01); *B60L 2270/32* (2013.01); *B60L 2270/34* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

FOREIGN PATENT DOCUMENTS

| | | |
|---|---|---|
| FR | 2 794 791 A1 | 12/2000 |
| WO | 2010/065979 A2 | 6/2010 |
| WO | 2010/115927 A1 | 10/2010 |

\* cited by examiner

CHARGING PLUG WITH LOCKING IDENTIFICATION

RELATED APPLICATION DATA

This application is a continuation of U.S. application Ser. No. 14/004,207 filed Sep. 10, 2013 which is a National Phase of PCT/DE2011/001952 filed Nov. 8, 2011 which claims priority of German Application No. 10 2010 044 138.4 filed Nov. 18, 2010, all of which are hereby incorporated herein by reference in their entireties.

FIELD OF THE INVENTION

The invention relates to a charging device of an electric vehicle with the features of the preamble of claim 1.

BACKGROUND

An electric vehicle is a vehicle which is propelled by an electric motor. The electric motor draws its power from a battery which is housed in the electric vehicle. This battery needs to be charged again after a discharge. For charging the battery, a charging device is used in the sense of the present invention. The charging device can be a part of the electric vehicle or a part of a charging station. If the battery of an electric vehicle is to be charged, the charging device of a charging station is connected mechanically and electrically with the charging device of an electric vehicle. Then, the battery can be charged by means of an electric current supplied by the charging station.

To avoid an unauthorized access during the charging of a battery of an electric vehicle, the mechanical and electrical connection between two charging devices must be locked during this time. A suitable locking device which is able to protect against unauthorized removal of the charging plug is disclosed in the publication DE 196 42 687 A1. For this purpose, this locking device comprises a control element for adjusting a bolt for the purpose of locking the charging plug. In order to provide a locking action, the bolt passes into a retaining opening.

SUMMARY OF THE INVENTION

The present invention provides a charging device for an electric vehicle that can very reliably protect against unauthorized access.

To this end, a charging device comprises the features of claim 1. Advantageous embodiments are disclosed in the dependent claims.

The charging device for an electric vehicle comprises a bolt for locking a connection between the charging device and another charging device. If the claimed charging device is connected mechanically to another charging device for the purpose of charging, this mechanical connection is then locked by moving an appropriate end of the bolt into a retaining opening of the other charging device. Such a retaining opening may be damaged, for example, by a bar (hereinafter referred to as "locking bar"), that serves for the locking and has been broken off, to such an extent that a locking is no longer possible. For this reason, a device is provided that is able to prevent the bolt from moving in the direction of the locking position if the retaining opening is damaged in such a manner. As a consequence, a lock damaged in the aforementioned manner will definitely not go unnoticed. Essentially, charging desirably requires a sufficiently undamaged, proper locking of the two charging devices involved It is not necessary or desired that just any damage to the retaining opening will result in preventing a movement of the bolt in the direction of the locking position. Instead, it is desirable that at least such damage to the retaining opening that renders a locking of a mechanical connection between two charging devices no longer possible would result in preventing the movement of the bolt in the direction of the locking position.

The device may comprise an electric switch or microswitch that is actuated by the aforementioned locking bar of the retaining opening when two charging devices are mechanically interconnected for a charging process. If the locking bar was broken off, the actuation of the switch or micro switch does not occur. In this case, the missing electrical signal has the specific consequence that any subsequent action required for the charging process is interrupted, and a charging process can therefore not take place. Therefore, the actuation of the microswitch is a prerequisite for making the charging of the battery of the electric vehicle possible, or at least for a locking process to occur.

In one embodiment, the charging device comprises a lever which is moved by the aforementioned locking bar of the retaining opening from a starting position into an end position when the claimed charging device is mechanically connected with another charging device. In addition, the charging device is designed so that locking is only possible when the lever has reached its end position. In the end position, the lever actuates an electrical switch, for example. Only the electrical signal triggered in this way will then permit or initiate, for example, the locking of the two charging device. The locking, in turn, is then a preferable prerequisite for the charging to commence.

In one embodiment of the invention, the aforesaid lever in the starting position mechanically blocks the bolt so that it cannot move into its locking position. Only by moving the lever to its end position is the blockade lifted, making the locking possible. This embodiment represents a purely mechanical solution that is capable of preventing the movement of the bolt towards the locking position in the case of relevant damage to the retaining opening. The dependence on electrical equipment is reduced accordingly and the energy required for a mechanical connection of two charging devices is kept correspondingly low. Minimizing the energy required for a mechanical connection is particularly advantageous if the claimed charging device is a part of the electric vehicle and should receive power from the battery of the electric vehicle. Particularly in this case, especially economical use must be made of the resources of the discharged battery, which is made possible by this embodiment.

In one embodiment of the invention, the aforementioned lever has an oblong hole into which extends a pin projecting from the bolt. The extension of the oblong hole is such that the elongated hole blocks a locking process in the starting position of the lever, and enables the locking process when the lever has been moved into its end position. In particular, the elongated hole extends at a suitable angle for this reason. The first area on one side of the angle will then have a blocking effect. The adjacent area allows the locking.

In one embodiment of the invention, the lever comprises a laterally projecting shield which shields the access to the retaining opening when the lever is in its starting position. When the lever is pivoted to its end position, or moved to the end position in some different way, the shield will also move away in such a way that the access to the retaining opening is unblocked. Only after such unblocking can the bolt be moved to its locking position.

In one form of embodiment, the lever has a lug which is always located within the plane of movement of the lever. In the starting position, the lug is able to block the access to the retaining opening, making it impossible for the bolt to lock. Only when the lever and hence the lug has been moved away, and the lever is then in its end position, can the bolt be moved into its locking position. However, it is also possible that, beginning from the starting position, only an initial rotary movement of the lever has the consequence that the lug, for example, is positioned in front of a laterally protruding pin of the bolt. If, for example, a micro switch or key switch has registered the initial rotary movement, then an ensuing signal can be used as a control for the start of movement of the bolt from its non-locking position in the direction of the locking position. The aforementioned pin protruding from the locking bolt will then continue to rotate the lever until the end position is reached. Further rotation can in turn be detected by the micro-switch mentioned above, that is thereby able to detect, at the same time, the attainment of the locking position and to stop, for example, a further movement or further action of a force on the bolt.

In one embodiment, the bolt is hook-shaped, for example L-shaped, and comprises, in the case of an L-shape, a long and a short flank. Both flanks enclose at least approximately a right angle. One end of the hook, for example the short flank in the case of the L-shape, can be moved into the retaining opening for locking. At least close to the other end of the hook, the bolt can be pivotably supported in order to enable the bolt to move between its locking position and its non-locking position.

Preferably, an electrical drive system acts on the aforementioned pivotably mounted end of the hook in order to move the bolt from its locking position to its non-locking position. This movement is performed after a charging of the battery of an electric vehicle in order to disconnect the two involved charging devices. Even the battery of the electric vehicle can then easily provide sufficient power for such a bolt movement so that a convenient electric drive system is then easily possible.

The present invention also includes the case that the bolt can be moved back and forth between the locking position and the non-locking position by an electric drive system.

In one embodiment of the invention, the lever comprises a passage for the bolt in the end position. If the lever is in its starting position, the passage is placed differently in spatial terms, so that the bolt cannot be moved into the retaining opening. This embodiment requires a relatively small space.

In one embodiment of the invention, the charging device comprises a mechanism which is able to move the bolt from its non-locking position to its locking position. This can be a pre-tensioned spring that pushes or pulls the bolt in the direction of the locking position. This embodiment further contributes to the feature that immediately before recharging no current of the battery of the electric vehicle needs to be consumed, not even when the charging device is part of the electric vehicle.

In one embodiment of the invention, there are one or more electrical microswitches or electrical switches with which the position of the lever and/or the bolt can be determined. Dependent thereon, electric drive systems for the lever and/or for the bolt can be controlled.

BRIEF DESCRIPTION OF THE DRAWINGS

Below, the invention is explained with reference to Figures.

DETAILED DESCRIPTION

Figure 1:
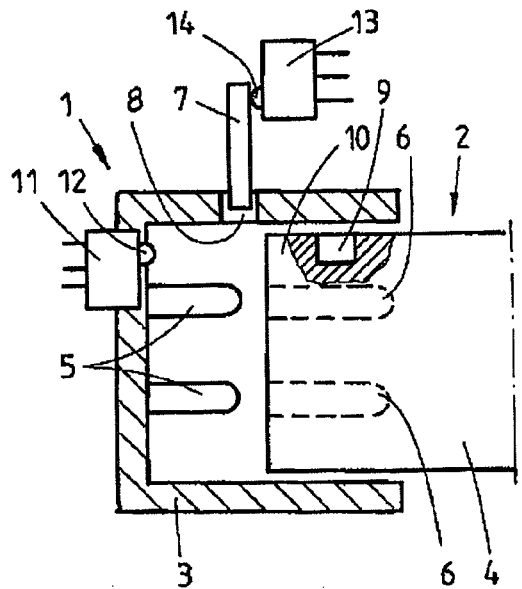
FIG. 1 is a cross-sectional view of a charging device with two microswitches.

FIG. 1 shows a charging device 1 of an electric vehicle that is to be connected with a further loading device 2 of a loading station. The charging device 1 comprises a housing 3 into which the housing 4 of the loading device 2 can be inserted. At the base of the housing 3, the charging device 1 comprises a number of electrical contact pins 5 which serve for the charging with DC and/or AC voltage. The electrical contact pins 5 are either connected permanently with the housing 3 or can, for example, be moved by an electric drive system along their longitudinal axis for the establishment of an electrical connection. The loading device 2 comprises corresponding electrical contact sockets 6, into which the electrical contact pins 5 are moved during a mechanical connection or following the locking of such a mechanical connection into such a lock, in order to thereby produce an electrical connection between the two charging devices 1 and 2. The charging device 1 comprises a bolt 7 that is mounted laterally on the outside of the housing 3. The associated housing wall 3 has an opening 8 for the bolt 7 through which the bolt 7 can be moved. The loading device 2 comprises, laterally in the housing 4, a retaining opening 9. If the second loading device 2 is inserted into the housing 3 of the charging device 1, the bolt 7 can be moved through the opening 8 into the retaining opening 9. The two devices 1 and 2 are then both connected mechanically to each other and are also locked. For the locking, a locking bar 10 is responsible, among other things, that borders the retaining opening 9 on the side that faces the base of the housing 3. At the base of the housing 3 of the charging device 1, a micro-switch 11 is located having a key 12 which extends into the interior of the housing 3. If the second charging device 2 is inserted into the housing 3 of the charging device 1, the locking bar 10 will eventually reach the key 12, pressing it into the micro-switch 11. In this way, an electrical contact is triggered. The electrical contact causes the bolt 7 to be moved from its non-locking position into the locking position. Therefore, following that, the mechanical connection between the two charging devices 1 and 2 has been locked.

If the locking bar 10 has been broken off, the key 12 of the micro-switch 11 can no longer be actuated. This prevents the bolt 7 from being moved into its locking position.

Preferably, the electrical contact pins 5 are mobile and can be moved, with their contacting ends, from the base of the housing 3 into the interior for making an electrical connection. This movement takes place specifically under the control of an electric drive system, and not until the bolt 7 has been moved into its locking position. For this purpose, a further micro-switch 13 may be provided that is able to detect the position of the bolt 7. If, for example, the bolt 7 has been moved from its non-locking position to its locking position, a key 14, for example, is released that causes an electrical impulse. This electrical pulse then causes the electrical contact pins 5 to be moved in the direction of the electrical contact sockets 6, and then into these sockets. Once the electrical contact pins 5 have assumed their final position in the electrical contact sockets 6, an electrical connection between the electrical contact elements 5 and 6 has been established. Thereafter, charging may take place.

If the electrical contact pins 5 are immobile, then the micro-switch 13 can be used for making charging possible, with electronic control, only after the bolt 7 has been moved to its locking position. If this is not the case, charging is blocked, for example, electronically.

The micro-switch 11 of FIG. 1 may also be located laterally on the housing 3, adjacent to the opening 8 as well as adjacent to the base of the housing 3 in order to be able to detect the presence of the bar 10. Here, again, the key 12 extends into the housing 3.

Figure 2:
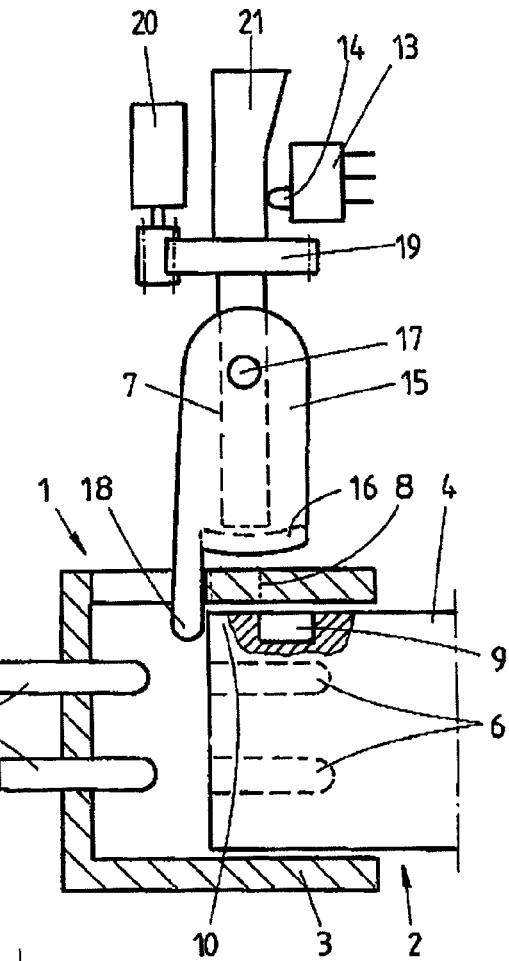
FIG. 2 is a cross-sectional view of a charging device with pivoting lever and shield.

FIG. 2 shows a further embodiment of the present invention. The housing 4 of a loading device 2 is inserted into the housing 3 of a charging device 1. Here, too, as in the case of the FIG. 1, the housing 4 is not yet fully inserted. Instead of a micro-switch 11, the charging device 1 comprises a lever 15, which in FIG. 2 is shown in its starting position. A shield 16 protrudes from the lever 15 in the plane of the paper. The shield 16 bars the access to the opening or passage 8 of the housing 3. In the case of FIG. 2, a bolt 7 is located partially behind the lever 15. The shield 16 prevents the bolt 7 from being moved through the opening 8. The lever 15 can be rotated or pivoted around the axis 17. The lever 15 comprises a projection 18 that extends into the housing 3. The projection 18 is placed so that it can be engaged and moved by the locking bar 10. In the starting position of the lever 18, the projection 18 extends laterally into the interior of the housing 3, as shown. Preferably, the projection 18 is dimensioned so that, in the end position of the lever, it is practically completely pivoted out laterally from the interior, and will then contact the housing 4 laterally, and will no longer contact the head end of the housing 4, as shown in FIG. 2. In this case, excessive space requirements with respect to depth for the charging device 1 are avoided. If the loading device 2 is moved fully into the housing 3 of the charging device 1, the lever 15 is pivoted from the shown starting position to the end position. Once the lever 15 has reached its end position, the shield 16 has been pivoted away from the opening 8. It is then possible to move the bolt 7 through the opening 8 and into the retaining opening 9 so as to lock the two devices 1 and 2 together.

If the locking bar 10 has been broken off, the projection 18 and therefore also the lever 15 is not pivoted in the direction of the end position. The shield 16 will then permanently prevent the bolt 7 from being moved into its locking position.

The bolt 7 can be configured as a spindle that can be moved, but cannot be rotated. There will then be a spindle nut 19 that can be rotated but can not be moved. If the spindle nut 19 is rotated by means of an electric drive system 20 that comprises, for example, an electric motor and a pinion or gear wheel, the bolt 7 is moved accordingly between its non-locking position and its locking position.

On the other hand, a micro-switch 13 may be provided which can be actuated by a widened end 21 of the bolt 7 when the bolt 7 has reached its locking position. Consequently, the position of the bolt 7 can be detected by means of the micro-switch 13. Preferably, a charging process can be started only when it has been determined in this way that the bolt 7 is in its locking position.

FIG. 2 shows the case where the contact pins 5 are not yet in a position to be electrically contacted with the contact sockets 6. These electrical contact pins 5 may be moved in the direction of electrical contact sockets 6 and into the latter once the mechanical connection between the two charging devices 1 and 2 has been locked. The micro-switch 13 may be used for causing such a movement of the electrical contact pins 5 into the contacting position as soon as the bolt 7 has been moved to its locking position.

The lever 15 may be pre-tensioned by a spring (not shown) in the direction of its starting position. If the loading device 2 is pulled out of the housing 3 of the charging device 1 after charging is completed and after unlocking has occurred, the lever 15 returns to its initial position shown in FIG. 2 due to the pre-tensioned spring.

Figure 3:
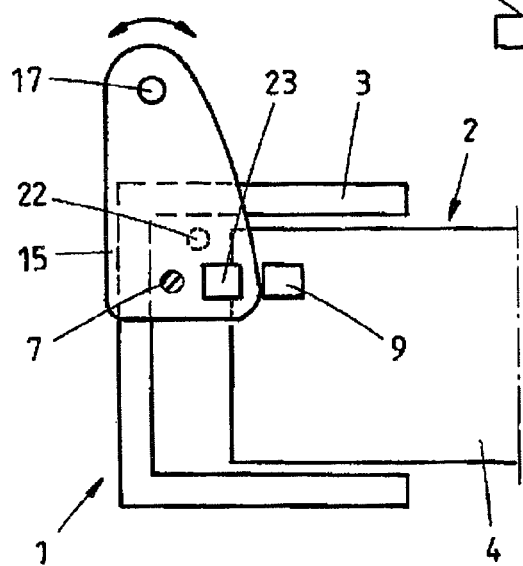
FIG. 3 is a cross-sectional view of a charging device with pivoting lever and passage in the lever.

FIG. 3 illustrates a further embodiment of the invention. It shows a top view of the retaining opening 9 in the housing 4 of the other charging device. The charging device 1 also comprises a lever 15 that is located in the starting position and prevents the bolt 7 (shown in cross-section) from being moved through an opening 3 of the lever 15. The lever 15 that is mounted so that it is able to pivot around the axis 17 comprises a pin 22 that extends into the interior of the housing 3. If the housing 4 of the loading device 2 is inserted into the housing 3 of the of the charging device 1, the housing 4 eventually reaches this protruding pin 22, and then pivots the pin together with the lever 15 from its depicted starting position into the end position. When the lever 15 has reached its end position, the passage 23 in the lever 15 is aligned with an opening that may be present in the housing 3 as well as with the retaining opening 9. The bolt 7 can then be moved through the respective openings into the retaining opening 9 for locking the mechanical connection.

This embodiment requires especially little space. The lever 15, in turn, can be moved by means of a pre-tensioned spring (not shown) back from the end position into the starting position as soon as the housing 4 of the loading device is pulled out of housing 3 again.

Figure 4A:
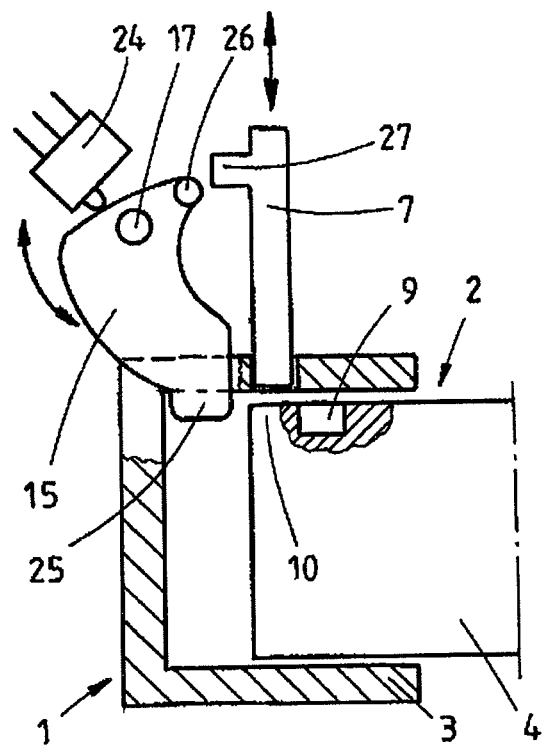
FIGS. 4A and 4B are cross-sectional views of a charging device with lever and lug.
Figure 4B:
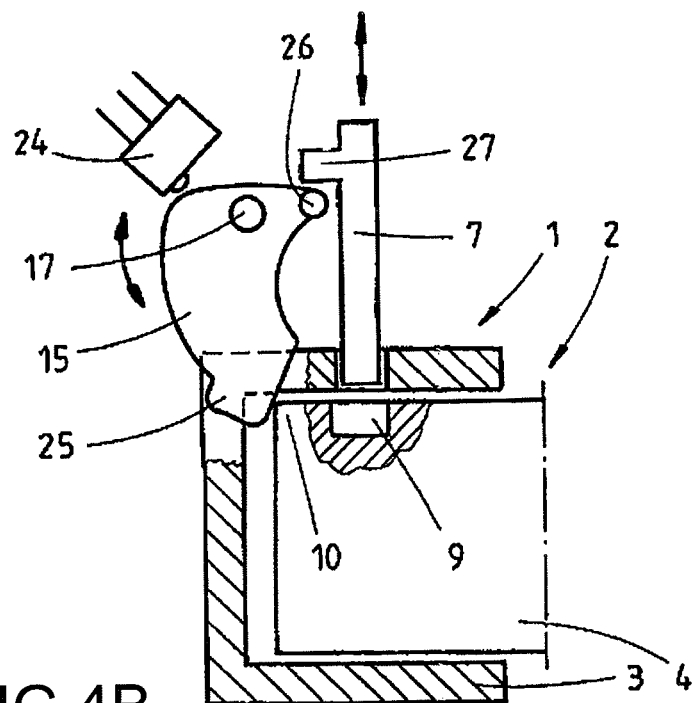

A particularly robust embodiment is illustrated in FIGS. 4*a* and 4*b*. This embodiment comprises a micro-switch 24 that is able to detect the position of the lever 15. FIG. 4*a* shows the starting position of the lever 15. If the additional loading device 2 is inserted into the housing 3 of the first charging device 1, the bar 10 eventually engages one end 25 of the lever 15, thus rotating the lever 15 into the end position, which is shown in FIG. 4*b*. In the end position, there is a lug 26 of the lever 15, which in this end position, but not in the starting position, can be engaged by a laterally projecting pin 27 of the bolt 7. When, initiated by the micro-switch 24, the bolt 7 is now moved into its locking position, the pin 27 engages the projection 26 and rotates the lever 15 beyond its final position. The interaction between the lever 15 and the micro-switch 24 is preferably configured so that this additional rotation can also be registered. Accordingly, reaching of the end position as well as the attainment of the locking position by the bolt 7 is detected with only one micro-switch 24.

If the bar 10 has been broken off, the lever 15 cannot be pivoted to its end position. An associated detection signal of the microswitch 24 will then be absent. In the absence of such a detection signal, a movement of the bolt 7 into its locking position will not take place, and/or the charging of the battery of an electric vehicle is electronically prevented.

Figure 5A:
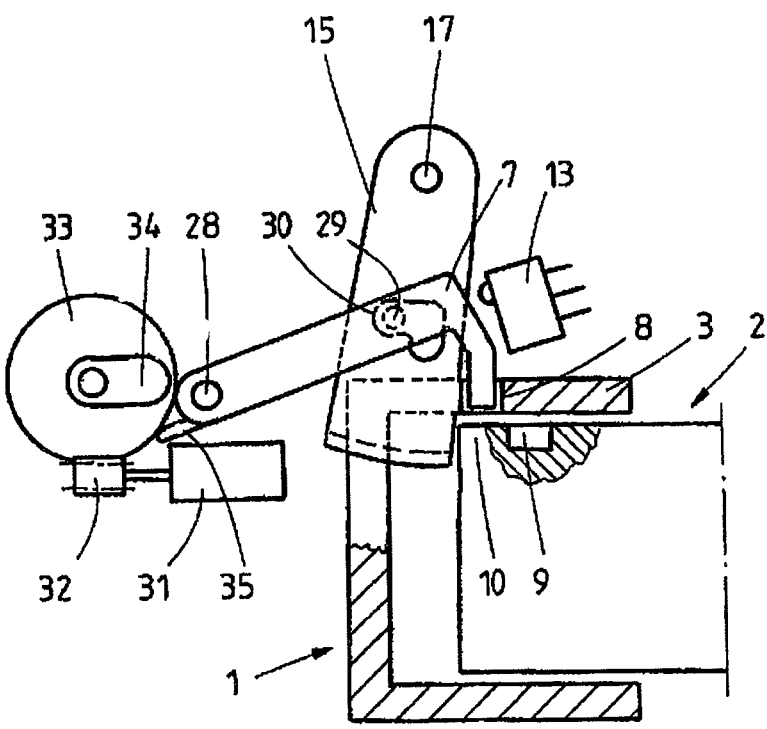
FIGS. 5A and 5B are cross-sectional views of a charging device with lever and elongated hole.
Figure 5B:
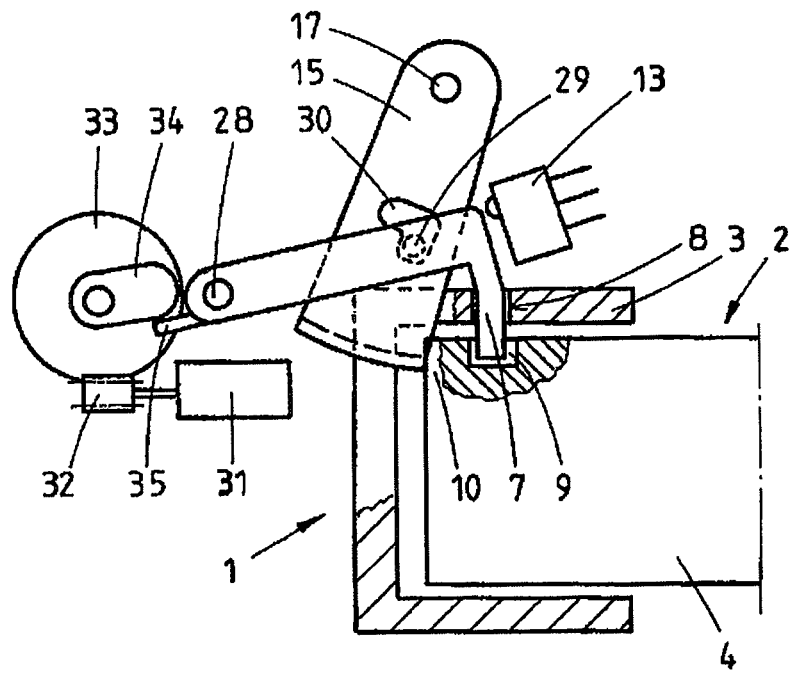

FIGS. 5*a* and 5*b* show a further embodiment of the invention. The bolt 7 is designed L-shaped and can be pivoted around an axis 28. The bolt 7 comprises a laterally projecting pin 29 which extends into an elongated hole 30, extending in an angular shape, of the lever 15. FIG. 5*a* shows the lever 15 in its starting position. One end of the lever 15 extends into the interior of the housing 3 of the charging device 1. The pin 29 is then located in an area of the elongated hole 30 that prevents the bolt 7 from being moved, for example by means of an appropriately pre-tensioned spring, through the opening 8 in the side wall of housing 3. When the lever 15 is moved by the locking bar 10 from the starting position shown in FIG. 5a into the end position shown in FIG. 5b, the pin 29 enters an area of the elongated hole 30 that permits a movement of the bolt 7 through the opening 8 into the retaining opening 9, as shown in FIG. 5b. By means of a micro-switch 13, the position of the bolt 7 can be detected in order to permit, for example in response thereto, a charging process. The bolt 7 is moved by means of an electrical drive system out of its locking position, following a charging process. For this purpose, a motor 31 is provided that drives a worm gear 32. The worm gear 32 rotates a pinion 33 which is provided with a projection 34. The projection 34 is able to pivot an end 35 of the bolt 7 in such a way that the bolt 7 can thereby be moved from its locking position shown in FIG. 5b into its non-locking position according to FIG. 5a.

LIST OF REFERENCE NUMBERS

1: charging device of an electric vehicle,
2: loading device of a charging station
3: housing
4: housing
5: electrical contact pin
6: electrical contact socket
7: bolt
8: bolt opening
9: retaining opening
10: locking bar
11: micro-switch
12: key
13: micro-switch
14: key
15: lever
16: shield
17: axis
18: projection
19: spindle nut
20: electric drive system
21: widened bolt end
22: bolt
23: passage
24: micro-switch
25: end of the lever
26: lever lug
27: locking pin
28: axis
29: laterally projecting pin
30: elongated hole
31: motor
32: worm gear
33: pinion
34: projection
35: end of bolt

What is claimed is:

1. A charging assembly for an electric vehicle that is connectable to a loading device of a charging station having a retaining opening, the charging assembly comprising:

a charging device having a bolt that is received in the retaining opening when in a locking position for locking a mechanical connection between the charging device and the loading device; and a blocking device connected to the charging device and moveable from a starting position to an end position, wherein the blocking device prevents a movement of the bolt towards the locking position when in the starting position and allows movement of the bolt towards the locking position when in the end position; and, a housing having an opening through which the bolt passes to move towards the locking position, wherein the blocking device includes a lever that enables, by moving to the end position, a charging of the battery either directly or indirectly or indirectly, and which only in its end position permits, directly or indirectly, a locking of the mechanical connection between the charging device and the loading device; and wherein the lever is rotatable and includes a shield that protrudes from the lever and prevents the bolt from passing through the opening of the housing, wherein the lever is rotatable to rotate the shield away from the opening and allow the bolt to pass through the opening; wherein the locking of the mechanical connection between the charging device and the loading device is only locked when the rotatable lever is in the end position.

2. The charging assembly according to claim 1, wherein the bolt is L-shaped and the lever is capable of blocking movement of the bolt by means of a laterally projecting pin that extends into an elongated hole of the bolt.

3. The charging assembly according to claim 1, wherein the lever is moved mechanically by a pre-tensioned spring into the starting position.

4. The charging assembly according to claim 1, wherein the lever has a lug that is engaged by the bolt for pivoting the lever, when in the end position.

5. The charging assembly according to claim 4 further comprising a micro-switch that is capable of detecting the starting position of the lever, the end position of the lever, and, indirectly, the locking position of the bolt, and is capable, in response thereto, of controlling movement of the bolt.

6. The charging assembly according to claim 1, wherein the charging device is part of an electric vehicle.

7. The charging assembly according to claim 6, wherein a battery of the electric vehicle is charged only when in the locking position.

8. A charging assembly for an electric vehicle that is connectable to a loading device of a charging station having a retaining opening, the charging assembly comprising:

a charging device having a bolt that is received in the retaining opening when in a locking position for locking a mechanical connection between the charging device and the loading device;

a blocking device connected to the charging device and moveable from a starting position to an end position, wherein the blocking device prevents a movement of the bolt towards the locking position when in the starting position and allows movement of the bolt towards the locking position when in the end position; and, a housing having an opening through which the bolt passes to move towards the locking position, wherein the blocking device includes a lever that enables, by moving to the end-position, a charging of the battery either directly or indirectly, and which only in its end position permits, directly or indirectly, a locking of the mechanical connection between the charging device and the loading device; and wherein the lever includes a passage through which the bolt passes to move towards the locking position and a pin that extends into the housing about which the lever is pivoted from the starting position to the end position, wherein the passage of the lever is aligned with the opening of the housing to allow the bolt to pass through the passage and the opening towards the locking position, when the lever is pivoted to the end position.

9. The charging assembly according to claim 1 further comprising electrical contact pins that are engageable with the loading device for establishing an electrical connection between the charging device and the loading device.

10. The charging assembly according to claim 1, wherein the charging station includes
a locking bar that borders the retaining opening, wherein movement of the bolt is actuated by engagement of the charging device and the locking bar and the locking bar is operable for preventing movement of the bolt towards the locking position.

11. The charging station according to claim 10, wherein the locking bar is configured to actuate an electrical contact when engaging the charging device, wherein the electrical contact allows movement of the bolt towards the locking position.

12. The charging assembly according to claim 8, wherein the lever is moved mechanically by a pre-tensioned spring into the starting position.

13. The charging assembly according to claim 8, wherein the charging device is part of an electric vehicle.

14. The charging assembly according to claim 8, wherein a battery of the electric vehicle is charged only when in the locking position.

15. The charging assembly according to claim 8, wherein the blocking device includes an electrical micro-switch that is actuated when in the end position, and that by its actuation permits, directly or indirectly, a charging of the battery, and makes possible by its actuation, directly or indirectly, a locking of the mechanic connection between the charging device and the loading device.

16. The charging assembly according to claim 15, wherein the blocking device includes a key, wherein when the charging device and the loading device are connected, the key is pressed into the micro-switch to actuate an electrical contact that causes the bolt to be moved towards the locking position.

17. The charging assembly according to claim 8, wherein the charging station includes a locking bar that borders the retaining opening, wherein movement of the bolt is actuated by engagement of the charging device and the locking bar and the locking bar is operable for preventing movement of the bolt towards the locking position.

18. The charging station according to claim 17, wherein the locking bar is configured to actuate an electrical contact when engaging the charging device, wherein the electrical contact allows movement of the bolt towards the locking position.

* * * * *